May 16, 1933.    S. J. PEHRSSON    1,908,783

TRUCK PLATFORM

Filed Oct. 2, 1929

Inventor
Sven Johan Pehrsson
Slough and Canfield
Attorney

Patented May 16, 1933

1,908,783

UNITED STATES PATENT OFFICE

SVEN JOHAN PEHRSSON, OF ELYRIA, OHIO, ASSIGNOR TO THE COLSON COMPANY, OF ELYRIA, OHIO, A CORPORATION OF OHIO

TRUCK PLATFORM

Application filed October 2, 1929. Serial No. 396,682.

This invention relates to trucks, skids and the like.

One of the objects of this invention is to provide a truck or skid of improved construction of the semi-live or semi-skid type.

Another object is to provide a truck or skid body or platform construction which will have the maximum of strength for the minimum of material, and which will be cheap and simple to manufacture.

Another object is to provide a truck or skid platform adapted to be embodied in trucks or skids of different types and usable for different purposes.

Another object is to provide a truck or skid platform formed from a single sheet of metal cut to shape as a blank and folded or bent at its edges to form a finished reinforced bed or platform.

Another object is to provide a platform formed from a single sheet of metal and blanked to suitable shape and bent or folded at the edges to form a truck or skid platform body, the reinforcements along the side of the longitudinal edges of the platform being of channel, angle tubular or the like form, to provide great strength as well as finished appearance.

Other objects will be apparent to those skilled in the art to which my invention pertains.

My invention is fully disclosed in the following description taken in connection with the accompanying drawing, in which, Fig. 1 is a top plan view of a truck embodying my invention, the truck being of the semi-skid or semi-live type.

Figure 7:
Figs. 6 and 7 are views similar to Figs. 4 and 5, respectively, but illustrating the use of sills in connection therewith.
Figure 6:

Referring to the drawing, I have shown at 1 a truck bed or body of platform type formed from a single sheet of metal preferably steel. The sheet metal is first blanked out to a rectangularly notched pattern indicated by the broken line, outline 2 having side edges 3—3, end edges 4—4, and notched out at 5, 5. To form the truck platform, the end edges 4—4 are bent downwardly as viewed in the drawing to a right angle with the main central portion 6 of the blank, to form end portions 7—7. The sides 3—3 of the blank are also bent downwardly to form side portions 8—8 and are then bent inwardly, to form flanges 9—9, thus making side portions 8' of inwardly open channel form.

At the corners of the platform, the end portions 7 have vertical edges 10 lying adjacent to vertical edges 11 of the side portions 8 and these edges are preferably welded to each other by welding material as indicated at 12—12.

It will be noted that the longitudinal extreme ends of the flanges 9 abut against the inner faces of the end portions 7 adjacent to the ends of the latter at each corner of the bed and the flanges 9 and the end portions 7 may at these abutting points be welded together if desired. The truck bed or platform thus constructed, although made of a single sheet of relatively thin metal is seen to give the appearance of a body of considerable vertical thickness when viewed from the outside; and the ends thereof are reinforced against bending or yielding under loads which may be placed upon the platform by the vertical end portions; and the longitudinally extending side portions of the platform are still more strongly reinforced to carry loads by being given channel form; and by means of the welded portions referred to, all parts of the platform are rigidly and permanently joined together and rendered additionally strong and durable.

Figure 1:
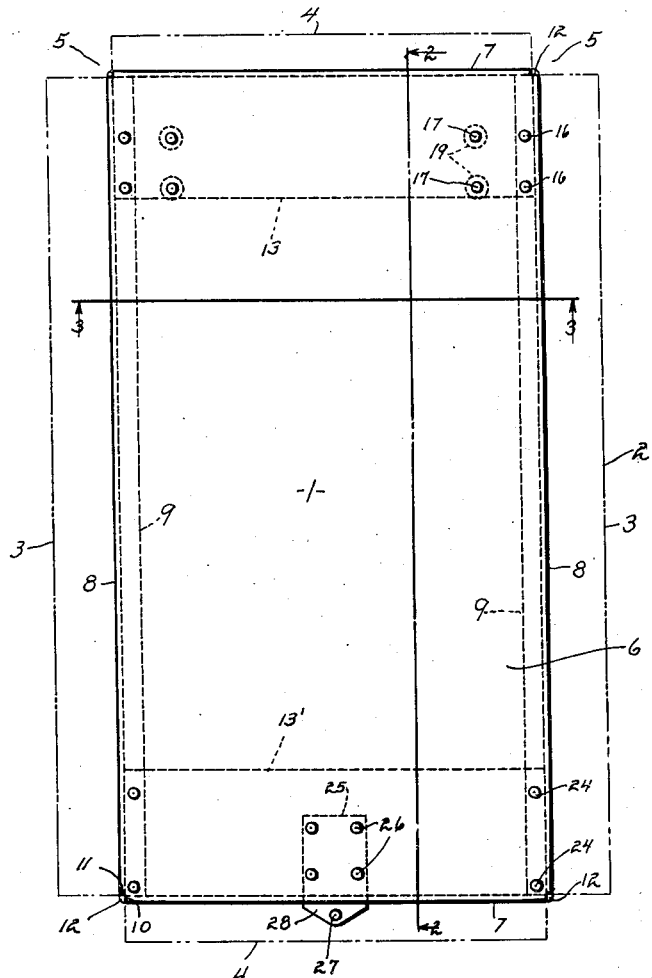
Figure 2:
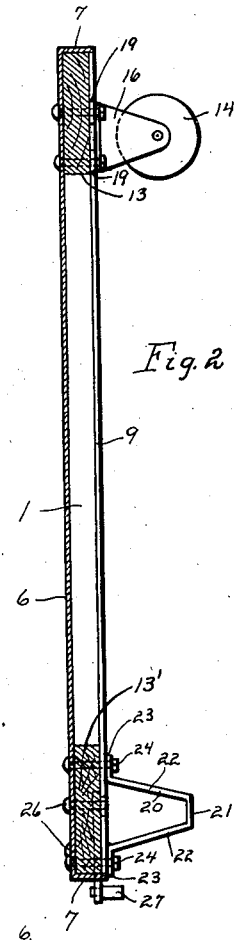
Fig. 2 is a side sectional view taken from the plane 2 of Fig. 1.
Figure 3:
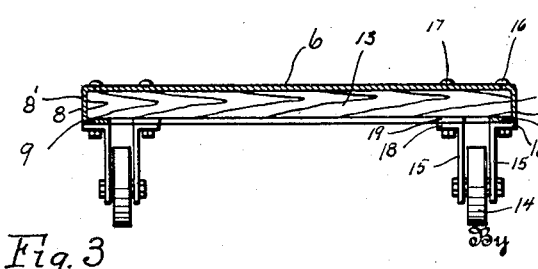
Fig. 3 is a front sectional view of the truck of Fig. 1 taken from the plane 3 of Fig. 1.

In the form of my invention illustrated in Figs. 1, 2 and 3 the platform or bed is shown applied to the type of truck known as semi-live or semi-skid. At each end of the bed or platform 1 and enclosed between the side and end portions 8 and 7 are sills 13 and 13' preferably of wood. The upper flat faces of the sills lie against the under surface of the central portion 6 of the platform, the longitudinal end edges of the sills abut against the inner faces of the end portions 7, and the transverse ends of the sills abut against the inner faces of the side portions 8, and adjacent to their ends, the under surfaces of the sills lie upon the flanges 9.

At one end of the platform or bed is provided a pair of supporting wheels 14 mounted in yokes 15, which are bolted by bolts 16, 16 and 17, 17 to the platform. The bolts 16 pass through flanges 18 of the yokes 15 and through the flanges 9 and through the sill 13 and top portion 6 of the truck platform, and the bolts 17 pass through flanges 18 of the yokes 15, and through spacing washers 19, sill 13 and top portion 6 of the platform. The other end of the truck is provided with a pair of skid brackets 20, comprising each a foot 21 adapted to rest on the floor and front and rear bracing legs 22, 22 terminating upwardly in attaching flanges 23—23, and secured to the underside of the bed by bolts 24—24 passing through the flanges 23, through the flanges 9 of the bed, through the sill 13' and through the top portion 6 of the platform. In the front end of the truck and on its longitudinal axis is a coupling device 28 comprising a plate 25 preferably bolted to the underside of the bed or to the underside of the sill 13' in any suitable manner as by bolts 26 passing through the plate 25 and through sill 13' and through top portion 6 of the bed, and having in its forward end a downwardly projecting pin or other suitable coupling arrangements 27.

By means of the foregoing construction the truck may be moved about from place to place by means of an auxiliary wheeled device not shown but known in the art which may be coupled to the coupling element 27 and the front end of the truck elevated to clear the foot 21 from the floor.

Figures 4, 5:
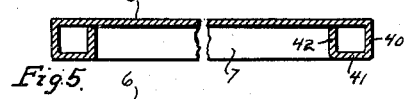
Fig. 4 is a view similar to Fig. 3 with parts omitted and showing a modification.
Fig. 5 is a view similar to Fig. 4 showing another modification.

In the form of my invention shown in Fig. 4, the side edges of the blank, besides being bent downwardly and inwardly to form side portions 30 and flanges 31 are again bent upwardly as at 32, outwardly as at 33, and upwardly as at 34, thus providing a side portion for the platform of a double thickness angle section. The end section 7 may be welded to the longitudinal ends of the side portions in the form of Fig. 4 similarly as in connection with the form of Figs. 1, 2 and 3.

In the form of my invention shown in Fig. 5 the side edges of the blank, besides being bent downwardly as at 40 and inwardly as in 41, are bent upwardly as at 42, thus providing side portions of the truck body of box, or tubular section as shown in Fig. 5, and again the end portions 7 may be welded to the side portions as above referred to.

Sills similar to those shown at 13 and 13' will preferably be used in the forms of my invention shown in Figs. 4 and 5 herein, but when used in the form of Fig. 5 the ends of the sills may abut upon the upturned portion 42. When used in the form of Fig. 4, the ends of the sills may abut against the upturned portion 34 or 32, or 34 and 32.

In Figs. 1, 2 and 3 my invention is shown as applied to a semi-live truck or skid; but it will be apparent that the improved platform or bed thereof and which forms one of the essential features of my invention may be embodied in skids of the dead type such as, for example, a skid having three or four skid brackets 20 and having no wheels or embodied in a platform truck of the live type having a number of wheels either castering or non-castering.

I thus show and describe three forms of platform or body adapted to be embodied in platform skids or the like. It will be understood that in the forms of my invention shown in Figs. 4 and 5 the truck or skid platform or body there illustrated may be combined with other truck or skid elements to form therewith a wheeled or other type of truck or skid, and that the form of my invention shown in Figs. 1 to 3 may be embodied with different other truck or skid elements than shown and described to form a truck or skid.

My invention is not limited to the exact details of construction shown and described. Many modifications and changes therein may be made other than those shown such as other sectional forms of the horizontal side portions of the truck, etc. without departing from the spirit of my invention or sacrificing its advantages.

I claim:

1. A truck or skid platform body formed from a single blank of sheet metal to have a flat top portion in the plane of the blank, end portions bent downwardly at an angle to the plane of the blank and longitudinally extending side portions bent downwardly at an angle to the plane of the blank and then inwardly parallel to the plane of the blank, and then bent upwardly at an angle to the plane of the blank, and a transversely disposed end sill element embraced within the said flat top portion, the end portion and side portions.

2. In a semi-live skid truck, a platform body formed from a single sheet of metal blanked out cruciform, two of the opposite limbs thereof being bent downward at an angle to the plane of the blank to form end portions of the body and the other two limbs of the blank being bent downwardly at an angle to the plane of the blank and inwardly parallel to the plane of the blank to form re-inforced side portions to the body, the side and end portions thus formed being welded together at corners of the body, the plane unbent portion of the blank forming a top for the body, a sill portion in each end of the body covered and enclosed by the end portions, the top portion and the downwardly bent and inwardly bent side portions, a pair of supporting wheel structures bolted to the body at the rear end thereof by bolts passed through the sill, a pair of skid brackets on the front end of the body bolted thereto by bolts passed through the other sill, and a coupling device comprising a plate bolted to the front sill and provided with a coupling element.

3. In a truck or skid, a platform body formed from a single sheet of metal blanked out cruciform, two of the opposite end limbs thereof being bent downward at an angle to the plane of the blank and the other two longitudinally extending oppositely disposed limbs of the blank being bent downwardly at an angle to the plane of the blank and inwardly parallel to the plane of the blank, and then bent upwardly at an angle to the plane of the blank, the adjacent limbs thus formed at corners of the body being secured together, a sill portion in each end of the body covered and enclosed thereby, a pair of supporting wheel structures affixed to the body at the rear end thereof by means of one of the sill portions, and a pair of skid brackets on the front end of the body secured thereto by means of the other sill portion.

4. In a semi-live skid truck, a platform body formed from a single sheet of metal blanked out cruciform, two of the opposite limbs thereof being bent downward at an angle to the plane of the blank to form end portions of the body and the other two limbs of the blank being bent downwardly at an angle to the plane of the blank and inwardly parallel to the plane of the blank to form re-inforced side portions to the body, the plane unbent portion of the blank forming a top for the body, a sill portion in each end of the body covered and enclosed by the end portions, the top portion and the downwardly bent and inwardly bent side portions, and supporting structures bolted to the body at the rear and front ends thereof by bolts passed through the sills.

5. In a semi-live skid truck, a platform body formed from a single sheet of metal blanked out cruciform, two of the opposite limbs thereof being bent downward at an angle to the plane of the blank to form end portions of the body and the other two limbs of the blank being bent downwardly at an angle to the plane of the blank and inwardly parallel to the plane of the blank to form re-inforced side portions to the body, the plane unbent portion of the blank forming a top for the body, a sill portion in each end of the body covered and enclosed by the end portions, the top portion and the downwardly bent and inwardly bent side portions, and supporting structures bolted to the body at the rear and front ends thereof by bolts passed through the sills and through the top.

6. In a semi-live skid truck, a platform body formed from a single sheet of metal blanked out cruciform, two of the opposite limbs thereof being bent downward at an angle to the plane of the blank to form end portions of the body and the other two limbs of the blank being bent downwardly at an angle to the plane of the blank and inwardly parallel to the plane of the blank and upwardly at an angle to the plane of the blank to form reinforced side portions to the body, the plane unbent portion of the blank forming a top for the body, a sill portion in each end of the body covered and enclosed by the end portions, the top portion and the downwardly bent and inwardly and upwardly bent side portions, and supporting structures bolted to the body at the rear and front ends thereof by bolts passed through the sills and through the top.

In testimony whereof I hereunto affix my signature this 6th day of September, 1929.

SVEN JOHAN PEHRSSON.